United States Patent [19]

Tward et al.

[11] Patent Number: 4,458,292
[45] Date of Patent: Jul. 3, 1984

[54] MULTIPLE CAPACITOR TRANSDUCER

[75] Inventors: Emanuel Tward, Northridge; Philip D. Junkins, West Los Angeles, both of Calif.

[73] Assignee: Tward 2001 Limited, Los Angeles, Calif.

[21] Appl. No.: 400,725

[22] Filed: Jul. 22, 1982

[51] Int. Cl.³ .............................................. H01G 7/00
[52] U.S. Cl. .................................................... 361/283
[58] Field of Search ............................ 361/283; 73/724

[56] References Cited

U.S. PATENT DOCUMENTS 2,725,548 11/1955 Harris .............................. 361/283 X

FOREIGN PATENT DOCUMENTS 2820478 11/1978 Fed. Rep. of Germany ...... 361/283

Primary Examiner—Donald A. Griffin
Attorney, Agent, or Firm—Philip D. Junkins

[57] ABSTRACT

A capacitive type pressure, force or displacement sensing transducer comprised of a mating pair of spaced dielectric elements each carrying a pair of capacitive elements forming two like capacitors of variable capacitance value depending upon the variable spacing distance between the dielectric elements and two like capacitors of fixed capacitance value. The pair of variable value capacitors and pair of fixed value capacitors comprise all of the capacitance elements of a Wheatstone bridge circuit in a single structural unit in which such capacitive elements are all subjected to the same temperature and pressure environment and which is not sensitive to stray capacitances. Each pair of capacitors forms opposing sides of the Wheatstone bridge circuit. A source of alternating current of constant voltage and set frequency is applied across a first set of bridge terminals at opposite corners of the bridge and a current detection circuit is connected across a second set of bridge terminals independent of the first set of terminals and at opposite corners of the bridge. Detection and measurement of the current value of the bridge circuit is translated into a value of force, pressure or motion applied to the transducer unit in direct linear relationship with the current value as determined by the separation distance between the spaced dielectric elements of the transducer.

7 Claims, 4 Drawing Figures

MULTIPLE CAPACITOR TRANSDUCER

BACKGROUND OF THE INVENTION

1. Field of the Invention

This invention relates to pressure, force or displacement sensing transducers and more particularly to capacitive type pressure or force sensing transducers.

2. Description of the Prior Art

Many forms of pressure, force or displacement sensing transducers utilizing capacitive sensors have been disclosed in the prior art. Most variable capacitive sensors have a deformable metallic member such as a diaphragm, bellows or beam which forms one plate of a plate type capacitor and can be moved relative to a base structure by the actuating force or pressure. An electrode member rigidly connected to, but electrically insulated from, the base and in close proximity to the deformable member forms the other plate of the variable capacitive sensor. Conventional capacitance sensors of this type have several significant disadvantages. Proper alignment of the sensor components is very difficult to achieve. Since reasonable values of capacitance and high relative change of capacitance with plate movement require very small gap dimensions, typically on the order of 0.001 inches, proper control of parallelism and gap dimensions is extremely important. To achieve proper alignment of the capacitor plates, very precise and small tolerances must be placed upon the component parts.

The possibilities for degradation of performance by thermal shift in structural alignment is difficult to avoid with a typical capacitive type transducer having long thermal paths in the structure determining the relative portions and alignment of the capacitance plates. The thermal problems include both the changes induced by different ambient temperatures and the transient effects produced when a temperature change occurs. These problems are further complicated by the fact that structure requirements for particular portions, such as the elastic properties of the diaphragm material, make it difficult to choose materials such that there may be a cancellation of the effects caused by thermal expansion. A further disadvantage of existing structures is that mounting stresses, which frequently occur when the structure is affixed to the system being measured, cause distortions in one or both of the capacitance plate and support structures. Such distortions can cause a shift in the initial value of the capacitive sensor and/or a change in the rate at which capacitance changes with applied force.

Capacitive pressure sensing transducers have also been constructed of ceramic, quartz or other dielectric materials to form chambers or walls with conductive films on their interior surfaces. U.S. Pat. Nos. 3,715,638 and 3,858,097 granted to W. R. Polye are illustrative of such constructions. The operative portions of these prior art constructions are substantially flat and of substantially uniform thickness. With chambers or capsules having walls of uniform thickness there is a stress concentration in the peripheral region where the walls are fused together and the deflection of the conductive surfaces of the transducer varies with the radial position of the deflection portion. In U.S. Pat. No. 4,168,518 granted to S. Y. Lee there is disclosed a capacitive pressure transducer structure in which deflection and maximum stress is controlled by the elastic properties and strength of the dielectric material carrying the capacitive plates rather than by the properties of a fusing or cementing material.

As previously related, prior art capacitive type pressure or force sensing transducers have been found to be sensitive to temperature change. They also have high impedance output and frequently require complex external electronic circuitry. The typical capacitive type transducers utilize a single plate type capacitor system and must be reactively as well as resistively balanced with external capacitive bridge circuitry. Long lead lengths and moving leads allow stray capacitive impedance pickup and thus introduce extraneous impedance variations to the detection, measurement and pressure or force value indication circuitry. It is often necessary to have a preamplifier close to the transducer.

SUMMARY OF THE INVENTION

The present invention relates to a capacitive type pressure or force sensing transducer comprised of a mating pair of spaced dielectric elements, each having a central portion presenting a planar surface which includes two like electrically conductive plates. Portions of at least one of the dielectric elements, outward of the central portion thereof, are of reduced cross-section. Beyond such reduced cross-sectional portions the end portions of the dielectric elements are affixed together to form a capacitive transducer unit having two like pairs of parallel opposed conducting surfaces. When pressure is applied to the central portions of the dielectric elements, deformation occurs in the regions of reduced cross-section so that the spacing of the conducting surfaces varies in relationship to the applied pressure or force. The change in pressure or force produces a corresponding change in capacitance between the two pairs of conductive plates which may be sensed by leads connected to such plates. The two conductive plates in the planar surface of the central portion of each dielectric element are each electrically connected to a further electrically conductive plate imbedded in such central portion whereby such connected imbedded plates togther form a fixed value plate type capacitor in each dielectric element. Thus, there are formed by the two conductive plates in the planar surface of each dielectric element and their respective connected embedded plates two like capacitors of variable capacitance value and two like capacitors of fixed capacitance value. The present invention overcomes the deficiencies of prior art capacitive type pressure or force sensing transducers by uniquely combining these four capacitances into classic Wheatstone bridge circuitry including an alternating current generator and current flow detection, measurement and value indicating circuitry.

It is an object of the present invention to provide an improved capacitive type pressure or displacement transducer of multi-capacitor design that is insensitive in its accuracy of pressure or force measurement to changes in the environmental characteristics to which it is exposed.

It is another object of the present invention to provide an improved capacitive type pressure or displacement transducer of multi-capacitor design which can be readily incorporated in classic Wheatstone bridge circuitry and which is insensitive in its accuracy of measurement to environmental changes or to stray capacitance.

It is a further object of the present invention to provide an improved capacitive pressure or displacement transducer including two like plate type capacitors of fixed capacitance value and two like plate type capacitors of variable capacitance value and in which the plates of the variable capacitors remain substantially parallel throughout the operating range of the transducer.

These and other objects of the invention will become apparent to those skilled in the art upon consideration of the accompanying specification, claims and drawing.

BRIEF DESCRIPTION OF THE DRAWING

Referring to the drawing, wherein like characters indicate like parts throughout the figures.

DESCRIPTION OF THE PREFERRED EMBODIMENT

The present invention is intended as an improvement on conventional capacitive pressure, force or displacement sensing transducers. The transducer of the invention incorporates a uniquely configured arrangement of four elongated plate type capacitors. The four capacitors are constructed from four electrically conductive capacitor elements each comprised of two electrically connected capacitive plates.

Figure 1:
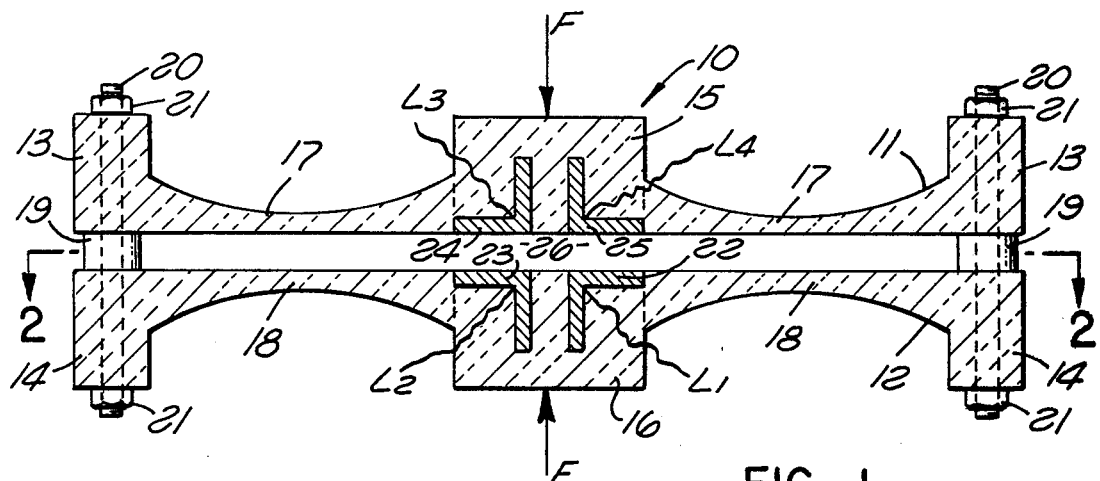
FIG. 1 is an elevation view in cross-section of the capacitive type pressure transducer of the present invention.
Figure 2:
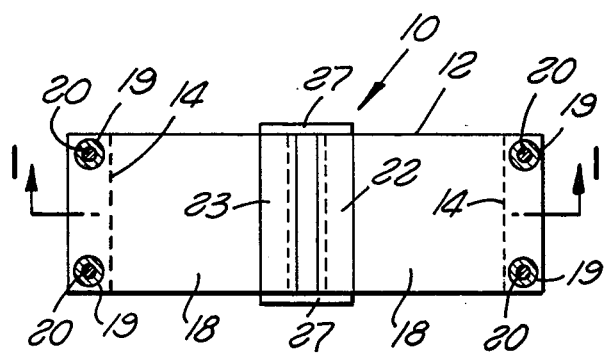
FIG. 2 is a plan view of the transducer of FIG. 1 taken at line 2—2 of FIG. 1.

Referring now to the drawing, a multi-capacitor pressure or force sensing transducer 10, in accordance with the invention, is illustrated in longitudinal cross-section in FIG. 1. The transducer is principally comprised of two like elongated contoured dielectric elements 11 and 12 having end portions 13 and 14, respectively, and central portions 15 and 16, respectively. Intermediate the end portions and central portion of each dielectric element 11 and 12 are reduced cross-sectional portions 17 and 18, respectively, which provide deflection regions to such elements. Spacers 19 serve to provide the desired spacing between elements 11 and 12. The elements are maintained in fixed spaced relationship by attachment to each other at their end portions by any appropriate means. As shown in FIG. 1 such attachment may be accomplished simply by passing bolts 20 through the elements 11 and 12 and spacers 19 and applying and tightening threaded nuts 21 thereto.

Figure 3:
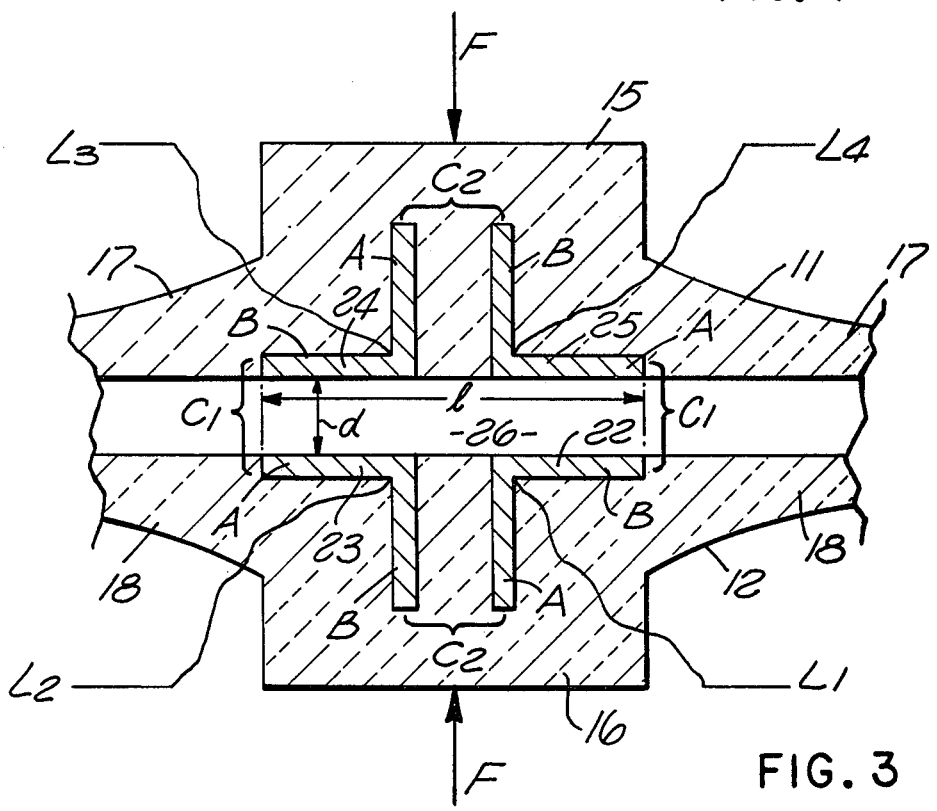
FIG. 3 is an enlarged partial elevation view in cross-section of the capacitive type pressure transducer of FIG. 1 showing in greater detail the arrangment of capacitors included in the transducer.

The central portions 15 and 16, respectively, of each dielectric element 11 and 12 present spaced and opposing planar surfaces including two like electrically conductive plates of capacitive elements 22, 23, 24 and 25. As shown in the enlarged partial cross-sectional view of FIG. 3 the capacitive elements 22, 23, 24 and 25 are each comprised of two capacitive plates "A" and "B". Thus, plate B of capacitive element 24 and plate A of capacitive element 25 form the central planar surface of dielectric element 11 and plate B of capacitive element 22 and plate A of capacitive element 23 form the central planar surface of diectric element 12, both of such surfaces extending for a length "l". Together these plates form two like capacitors $C_1$ of variable capacitance value depending upon the spacing distance "d" between such plates and the dielectric constant value of the material filling space 26 between the opposing central planar surfaces of dielectric elements 11 and 12. End members 27 of dielectric material may be affixed to the edge surfaces at each central portion 15 and 16 of dielectric elements 11 and 12 to cover the ends of the capacitive elements 22, 23, 24 and 25 and to protect against electric connection between same.

Figure 4:
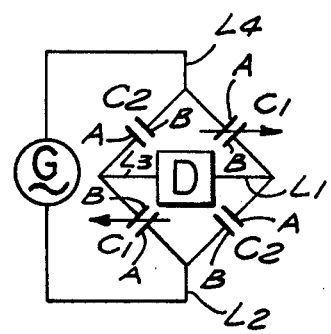
FIG. 4 is a schematic block diagram of circuitry in which the capacitors of the transducer of FIG. 1 are clearly identified in a classic Wheatstone bridge circuit configuration.

Within the central portions 15 and 16, respectively, of dielectric elements 11 and 12, capacitive plate A of capacitive element 24 and capacitive plate B of capacitive element 25 form a capacitor $C_2$ of fixed capacitive value and capacitive plate A of capacitive element 22 and capacitive plate B of capacitive element 23 form a second capacitor $C_2$ of like fixed capacitive value. As will be appreciated from study of FIGS. 1 and 3 of the drawing, the four capacitive elements 22, 23, 24, and 25 of the transducer 10 of the invention are insulated from each other within the structure of the device. Electrically conductive lead wires L1, L2 L3 and L4 are connected, respectively, to the elements 22, 23, 24 and 25 and leave the transducer 10 via appropriate insulated passage therefrom. When these lead wires are further connected to alternating current generator circuitry "G" and detection, measurement and value indicating circuitry "D", as shown in FIG. 4, there results simple bridge circuitry of classic Wheatstone configuration.

The alternating current generator circuitry G is connected to the bridge circuitry (the $C_1$ pair of capacitors and $C_2$ pair of capacitors) through input lead wires L2 and L4. Outlet wires L1 and L3 connect the bridge circuitry to the detector circuitry D (including appropriate current rectifier circuitry, if required), bridge interrogation circuitry, current measurement circuitry and current value indicating circuitry. Because all four capacitors of the bridge circuit are clustered together within the transducer 10 the circuitry is not subject to stray capacitance and long leads may be used to connect the pressure or force sensing device with the current generator circuitry G and/or the detector, measurement and indicating circuitry D.

In applying the pressure or force sensing transducer of this invention to a force measurement situation in which opposing forces F are applied to central portions 15 and 16 of dielectric elements 11 and 12, said forces cause capacitive plates B and A of capacitive elements 24 and 25 of portion 15 and capacitive plates B and A of capacitive elements 22 and 23 of portion 16 to approach each other more closely due to the deflection of the reduced cross-sections 17 and 18. The reduction in the spacing (spacing distance "d") between these capacitive plates will result in an increase in the capacitance value which variable capacitors $C_1$ display with respect to the bridge circuitry. Since the deflection takes place almost solely in the regions of reduced thickness of dielectric elements 11 and 12 rather than the central regions defined by portions 15 and 16 of such elements, the capacitive plates forming capacitors $C_1$ remain in substantially planar parallel relationship as the spacing distance "d" varies. Thus, additional non-linear variations in capacitance and hysteresis are not introduced through changes in the surface configuration due to bending of the material of the dielectric elements. Even if the planar capacitive surfaces of elements 11 and 12 experience some non-parallelism during the flexing of elements 11 and 12 under forces F, the fact that such surfaces are represented by two like capacitors $C_1$ in the electronic Wheatstone bridge circuitry overcomes adverse non-parallelism flexing effects.

Before the application of any forces F to the transducer of this invention the applied alternating current is varied as to its frequency and/or voltage and/or the detector circuitry (including its measuring and/or force value indicating instrumentation) is adjusted in known manner to obtain the appropriate sensitivity required for measuring the pressure, force or displacement values that are to be applied to the transducer. For the bridge circuit of FIG. 4 the respective capacitors may have impedance values as indicated below:

Fixed value capacitors
  $C_2$ impedance $= Z_2$
Variable value capacitors
  $C_1$ impedance $= Z_1$ The detector circuitry D also presents an impedance value which may be designated as $Z_3$. The alternating current generator circuitry, at set frequency, has a constant voltage "e" which is applied across the bridge. Thus, If $Z_3$ is of small value, i.e., $Z_3 < Z_1$ and $Z_2$ then it can be established that the current "i" through the detector circuitry is:

$$i = (e\omega \div 2)(C_1 - C_2)$$

where
  e is the voltage value and
  $\omega = 2\pi \times$ frequency

The current value i in the detector circuitry changes in linear relation to changes in the capacitance value of capacitors $C_1$. Therefore, changes in the $C_1 - C_2$ relationship may be determined by measuring changes in the current value i. Furthermore, with appropriate detector and a.c. generator circuitry (e.g. by keeping the current i constant and varying the $\omega$ value) the readout of the $C_1 - C_2$ value can be effected by measuring the period of the angular frequency $\omega$. Thus, the readout instrumentation in the detector circuitry may yield digital values of force, pressure or displacement in direct linear relationship to the changes in capacitances $C_1$ (for small changes in $C_1$).

From the foregoing, it will be appreciated that the bridge circuitry, comprised of the two like and substantially fixed value capacitors and the two like variable value capacitors, is arranged to be in an unbalanced state (current flowing through the detection circuit) at all instances when pressure or force is applied to the transducer elements 15 and 16 and the dielectric value of space 26 varies from its normal value. With the bridge circuitry structured and operating in this fashion the detector circuitry reads the bridge unbalance (value of current flow) linearly as a direct measurement of capacitance value difference and the detector circuitry with associated measurement and value indicating circuitry will report or display such difference or may be modified by well known circuitry means to report or display the actual (changing) capacitance value of space 26 or the actual (changing) force value applied.

While a certain preferred embodiment has been described above, it will be apparent to those skilled in the art that modifications may be made for specific applications without departing from the spirit and scope of the novel concept of this invention. Thus, a force or pressure measuring instrument may be the ultimate form of the invention, or the novel transducer may be part of an operating system wherein the change in capacitance (related to the application of force or pressure) is used to control a parameter which will affect system performance and the force or pressure being measured. Therefore, it is intended by the appended claims to cover all such modifications and variations which fall within the true spirit and scope of the invention.

What is claimed is:

1. A capacitive type pressure or displacement sensing transducer comprising:
   (a) two elongated transducer body elements formed of dielectric material and positioned in spaced parallel relationship, each of said body elements having a central portion and terminal end portions and at least one of said body elements being capable of deflection upon the application of an external pressure force to its central portion;
   (b) four electrically conductive capacitor elements each formed to present two angularly disposed and electrically connected capacitive plates with two of said capacitor elements mounted in fixed spaced relationship from one another in the central portion of each of said transducer body elements and positioned therein so that each capacitive plate thereof defines with a capacitive plate of the next adjacent capacitor element a dielectric space therebetween whereby said mounted capacitor elements together form four dielectric spaces, a first pair of said dielectric spaces being comprised of the like dielectric space located within each central portion of each transducer body element between capacitive plates of the capacitor elements mounted therein and said first pair of like dielectric spaces containing the dielectric material of said transducer body elements thereby forming with their respective space defining capacitive plates two capacitors of like fixed electrical capacitive value; and
   (c) means for holding the terminal end portions of said transducer body elements in fixed spaced relationship to establish and maintain the transducer body elements in their spaced parallel relationship whereby capacitive plates of the two capacitor elements in the central portion of one of said body elements define with capacitive plates of the two capacitor elements in the central portion of the other of said body elements a second pair of said dielectric spaces comprised of like open dielectric space located between said body elements, said second pair of like open dielectric spaces forming with their respective space defining capacitive plates two capacitors of like variable electrical capacitive value, the application of an external pressure force to the central portion of said transducer body elements causing deflection of at least one of said elements and a change in the spacing distance between the central portions of said body elements thereby varying the electrical capacitive value of said variable value capacitors in direct relationship to the force value of said pressure force.

2. A capacitive type pressure or displacement sensing transducer as defined in claim 1 wherein both of the elongated transducer body elements are capable of deflection upon application of equal and opposing external pressure forces to the central portions thereof.

3. A capacitive type pressure or displacement sensing transducer as defined in claim 1 wherein intermediate portions of the elongated transducer body element capable of deflection between the central portion and the terminal end portions thereof are of reduced thickness of dielectric material whereby application of an external pressure force to said central portion causes deflection of said intermediate portion(s) of said body element to a substantially greater degree than deflection of said central portion whereby distortion of the central portion of said body element is reduced.

4. A capacitive type pressure or displacement sensing transducer as defined in claim 1 wherein intermediate portions of the elongated transducer body elements between the central portions and the terminal end portions thereof are of reduced thickness of dielectric material whereby application of equal and opposing external pressure forces to said central portions causes deflections of said intermediate portions of said body elements to a substantially greater degree than the deflections of said central portions of said body elements whereby distortion of the central portions of said body elements is reduced.

5. A capacitive type pressure or displacement sensing transducer as defined in claim 1 wherein means are provided to apply force to at least one of said central portions of said transducer body elements to provide a force sensing transducer.

6. A capacitive type pressure or displacement sensing transducer as defined in claim 1 wherein means are provided to connect the two capacitors of like fixed electrical capacitive value and the two capacitors of like variable electrical capacitive value together to form the four capacitive sides of a Wheatstone bridge circuit, the pair of fixed value capacitors connected as two opposing sides of said bridge and the pair of variable value capacitors connected as the remaining two opposing sides of said bridge.

7. A capacitive type pressure or displacement sensing transducer as defined in claim 6 wherein a source of alternating current of constant voltage and set frequency is applied across said bridge circuit to a first set of bridge terminals at opposite corners of the bridge, each of said first terminals located between a fixed value capacitor and a variable value capacitor, and a detection circuit is connected across said bridge circuit to a second set of terminals independent of said first set of terminals and at opposite corners of the bridge, each of said second terminals located between a fixed value capacitor and a variable value capacitor, said detection circuit including current value measurement and current value indication circuitry.

* * * * *